United States Patent
Gruber et al.

(10) Patent No.: US 10,863,467 B2
(45) Date of Patent: Dec. 8, 2020

(54) COMMUNICATION DEVICE AND METHOD FOR OPERATING AN ANTENNA RESONANT CIRCUIT

(71) Applicant: Infineon Technologies AG, Neubiberg (DE)

(72) Inventors: Josef Gruber, St. Ruprecht an der Raab (AT); Edmund Ehrlich, Graz (AT); Matthias Emsenhuber, Graz (AT); Juergen Hoelzl, Graz (AT); Matthias Pichler, Wildon (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/591,864

(22) Filed: Oct. 3, 2019

(65) Prior Publication Data
US 2020/0112932 A1    Apr. 9, 2020

(30) Foreign Application Priority Data
Oct. 4, 2018 (DE) .......... 10 2018 124 480

(51) Int. Cl.
*H04B 5/00* (2006.01)
*H04W 56/00* (2009.01)
*H01Q 1/24* (2006.01)

(52) U.S. Cl.
CPC .......... *H04W 56/0015* (2013.01); *H01Q 1/24* (2013.01); *H04B 5/0031* (2013.01); *H04B 5/0056* (2013.01)

(58) Field of Classification Search
CPC ........ H01Q 23/00; H01Q 1/24; H04B 5/0031; H04B 1/18; H04B 5/0056; H04W 56/0015; H04W 40/005; H04W 56/002
See application file for complete search history.

(56) References Cited

U.S. PATENT DOCUMENTS

| | | | | |
|---|---|---|---|---|
| 4,301,537 A | * | 11/1981 | Roos | H04L 7/0083 331/1 A |
| 2007/0164752 A1 | * | 7/2007 | Kato | A61B 5/0006 324/606 |
| 2008/0106919 A1 | * | 5/2008 | Shin | H02P 6/14 363/131 |
| 2015/0079914 A1 | * | 3/2015 | Takahashi | H01Q 1/3241 455/127.2 |
| 2016/0138492 A1 | * | 5/2016 | Levy | F02D 29/02 701/102 |
| 2018/0049147 A1 | * | 2/2018 | Chen | H04W 56/00 |

FOREIGN PATENT DOCUMENTS

EP    3145092 A1    3/2017

OTHER PUBLICATIONS

German Patent Office, Office Action issued for DE 102018124480.0, 8 pgs., dated Jul. 5, 2019.

* cited by examiner

*Primary Examiner* — Nhan T Le
(74) *Attorney, Agent, or Firm* — Schiff Hardin LLP

(57) ABSTRACT

A communication device having an antenna resonant circuit, an antenna driver which is configured to feed a carrier wave to the antenna resonant circuit, and a controller which is configured to detect that a synchronization period is imminent and is configured to control the antenna driver in such a way that the antenna driver feeds the inverted carrier wave to the antenna resonant circuit.

12 Claims, 7 Drawing Sheets

COMMUNICATION DEVICE AND METHOD FOR OPERATING AN ANTENNA RESONANT CIRCUIT

TECHNICAL FIELD

Example embodiments generally relate to communication devices and methods for operating an antenna resonant circuit.

BACKGROUND

Modern electronic devices such as mobile telephones and chip cards are often equipped with support for near-field communication (NFC), for example in order to enable cashless payments. A typical requirement here is to be able to make do with an antenna which is as small as possible, while the data communication is nevertheless intended to take place efficiently and robustly. Approaches are accordingly desirable which enable antennas to be used effectively for near-field communication.

SUMMARY

According to one example embodiment, a communication device is provided having an antenna resonant circuit, an antenna driver which is configured to feed a carrier wave to the antenna resonant circuit, and a control device which is configured to detect that a synchronization period is imminent and is configured to control the antenna driver in such a way that it feeds the inverted carrier wave to the antenna resonant circuit.

According to a further example embodiment, a method is provided for operating an antenna resonant circuit according to the communication device described above.

BRIEF DESCRIPTION OF THE DRAWINGS

The figures do not reflect the actual size ratios, but are intended to serve to illustrate the principles of the different example embodiments. Different example embodiments are described below with reference to the following figures.

DETAILED DESCRIPTION

The following detailed description relates to the attached figures which show details and example embodiments. These example embodiments are described in such detail that the person skilled in the art can implement the invention. Other embodiments are also possible and the example embodiments can be modified in structural, logical and electrical terms without departing the subject-matter of the invention. The different example embodiments are not necessarily mutually exclusive, but rather different embodiments can be combined with one another so that new embodiments are created. For the purposes of this description, the terms "linked", "connected" and "coupled" are used to describe both a direct and an indirect link, a direct or indirect connection and a direct or indirect coupling.

Figure 1:
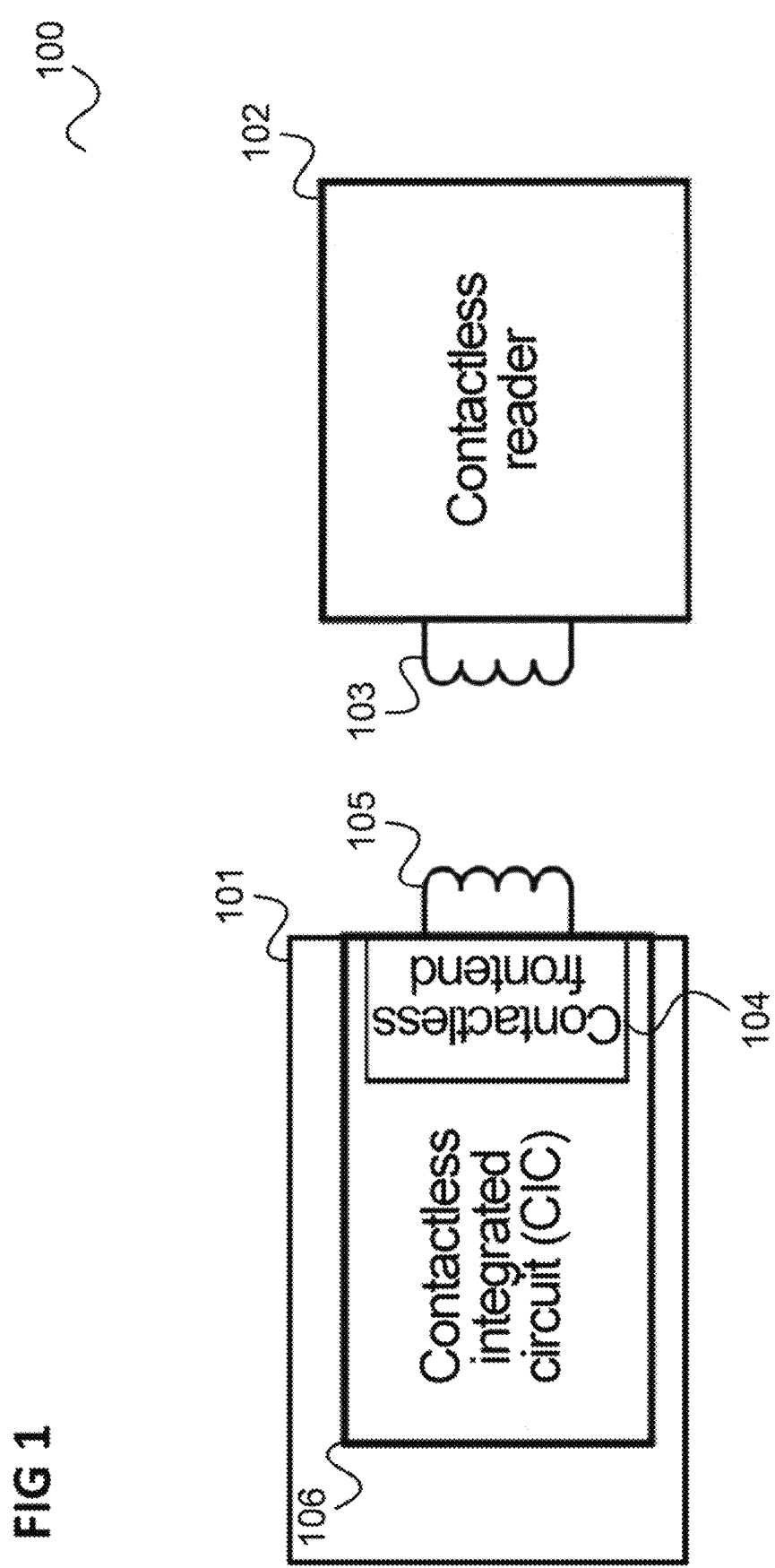
FIG. 1 shows a communication arrangement with a passive NFC communication device.

FIG. 1 shows a communication arrangement 100 with a passive NFC communication device 101.

The NFC communication device 101 communicates with an NFC reading device 102, also referred to as a PCD (proximity coupling device).

The NFC reader device 102 emits a reader field via a reader antenna 103, said reader field being modulated by a frontend for contactless communication 104 of the NFC communication device 101 using an NFC antenna 105. The modulation is recognized in turn by the NFC reader device 102. An integrated circuit 106 of the NFC communication device 101 controls the modulation in such a way that data can be transmitted in this way from the NFC communication device 101 to the NFC reader device 102. The frontend 104 is, for example, part of the integrated circuit 106.

Figure 2:
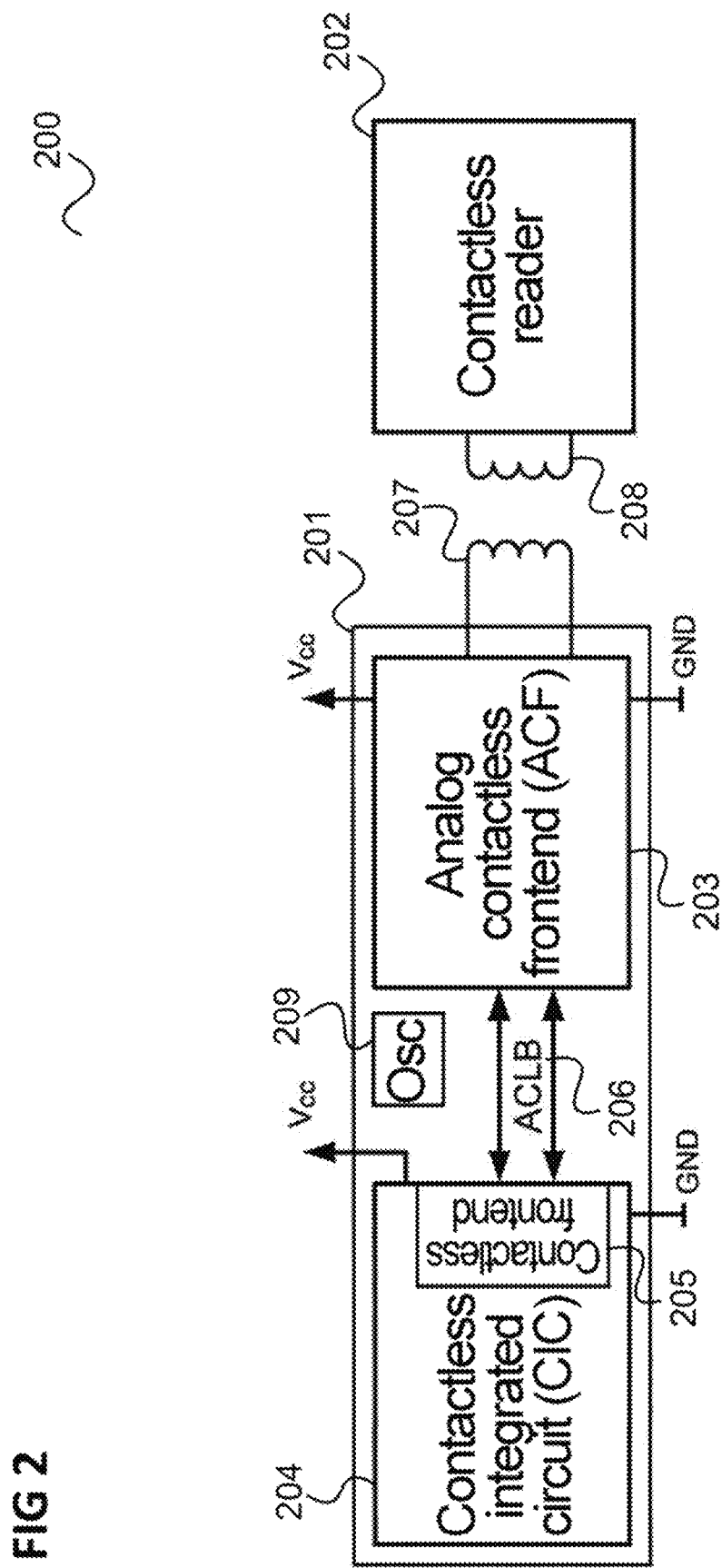
FIG. 2 shows a communication arrangement with an active NFC communication device.

FIG. 2 shows a communication arrangement 200 with an active NFC communication device 102.

As in FIG. 1, the NFC communication device 201 communicates with an NFC reader device 202.

In this example, however, the NFC communication device 201 is an active communication device. It has an active analog booster frontend 203 for contactless communication 202. The booster frontend 203 is connected via an interface 206, e.g. via an ACLB (Active Contactless Bridge), to an integrated circuit 204 which has a contactless frontend 205. The integrated circuit 204 can exchange data via the interface 206 with the booster frontend 202. The booster frontend 202 is coupled with an NFC antenna 207 of the NFC communication device 201 and transmits radio signals via the NFC antenna 207 to the reader device 202 which the reader device 202 receives by means of a reader antenna 208, or receives radio signals from the reader device 202 by means of the NFC antenna 207 which the reader device 202 emits by means of the reader antenna 208.

The NFC communication device 201 (for example the booster frontend 203) modulates a carrier signal in order to transmit data to the reader device 202. A corresponding carrier wave with a certain carrier frequency is supplied by a frequency generator 209, typically an oscillator.

Both the integrated circuit and the booster frontend are active components and have a voltage supply as indicated by the connections Vcc (for the supply voltage) and GND (for the ground potential).

The passive communication device 101 is, for example, a device which does not have its own energy supply (i.e., for example, no battery), such as, for example, a chip card (e.g. a smartcard) in the typical card form (e.g. a staff restaurant card, an ID card or a card for payment in local public transport). However, devices also exist which have an energy supply (typically a battery) and which support NFC communication, for example for cashless payment. The active communication device 201, for example, corresponds to a device of this type. Examples of communication devices of this type are mobile telephones, watches (smartwatches) or other wearable devices which support NFC.

In this example, the active communication device 201 is designed according to a boosted NFC architecture. This enables, in particular, the use of a smaller NFC antenna 207 than in the case of the passive communication device 101 with the NFC antenna 105.

In modern communication devices, however, the surface area provided for an NFC antenna attains values of less than 100 mm$^2$ and therefore special transmission modes are nevertheless required in order to increase the amplitude visible to the reader device 202 during the modulation of a radio signal. One possibility here is XOR (exclusive OR) transmission or BPSK (Binary Phase Shift Keying) modulation.

For a transmission of data to the reader device 202, such as an XOR or BPSK transmission, the NFC communication device 201 (for example the booster frontend 203) synchronizes its oscillator 209 with the frequency of a radio signal (also referred to as the reader field) emitted by the reader device 202 which can be regarded as a reference signal for the NFC communication device 201.

The oscillator is, for example, part of a PLL (phase-locked loop), a DLL (delay-locked loop) or a combined system and the booster frontend 203 synchronizes the oscillator 209 and therefore its transmit frequency, i.e. the carrier signal which it uses for transmission, with the frequency and phase of the radio signal emitted by the reader device 202. For this purpose, a short gap between the transmit periods, i.e. time intervals in which the NFC communication device 201 transmits, is required so that the NFC communication device 201 can receive the radio signal emitted by the reader device 202, also referred to below as the reference signal.

However, in the case of a high-quality NFC antenna 207, it is necessary to remove (at least a large part of) the energy contained in the antenna resonant circuit (meaning the electromagnetic energy which oscillates in the resonant circuit between the capacitor and inductor) which the booster frontend 203 has fed into the antenna resonant circuit for a preceding transmission before the NFC antenna 207 receives the reader field.

Figure 3:
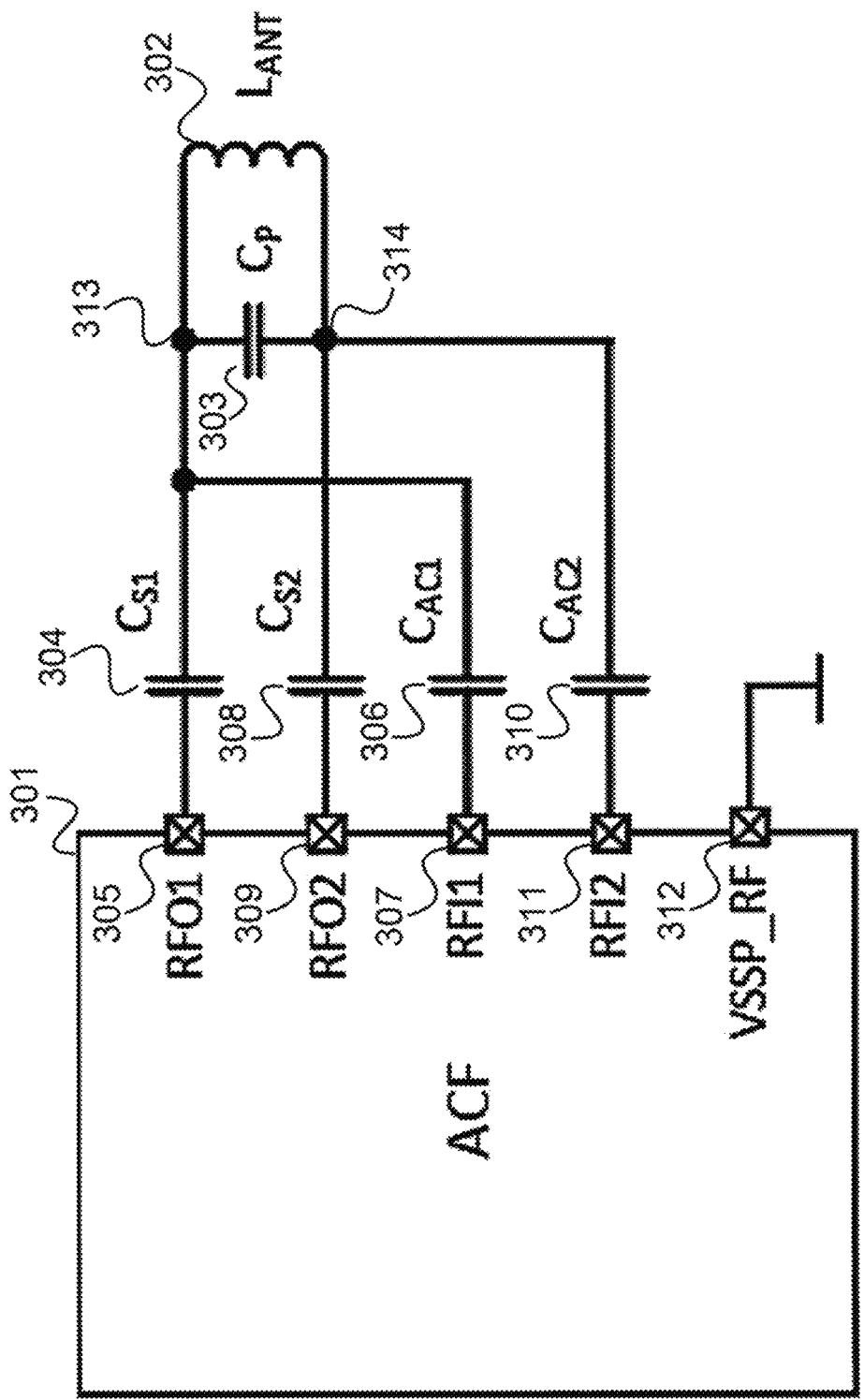
FIG. 3 shows an arrangement with a frontend and an antenna connected thereto.

FIG. 3 shows an arrangement with a (booster) frontend 301 and an antenna 302 connected thereto.

The frontend 301 corresponds, for example, to the booster frontend 203 and the antenna 302 corresponds, for example, to the NFC antenna 207.

The antenna 302, jointly with the capacitors 303, 304, 308 and outputs 305 and 309 of the frontend 301, forms an antenna resonant circuit.

A first connection 313 is coupled via a capacitor 306 to a first input 307 of the frontend 301.

A second connection 314 of the antenna 302 is coupled via the capacitor 308 to a second output 309 of the frontend 301 and via a capacitor 310 to a second input 311 of the frontend 301.

The frontend 301 furthermore has a ground connection 312.

One possibility for removing energy contained in the antenna resonant circuit is to connect a resistor in parallel with the antenna 302, e.g. between the inputs 307, 311, so that the energy of the antenna resonant circuit is damped (i.e. reduced, through discharge) in a transmit pause. However, this approach is problematic for a high-quality or high-inductance antenna 302, since, in this case, the voltage on the antenna resonant circuit can exceed the maximum permissible operating voltage on the input connection 311, 312 of the frontend 301. The use of the external decoupling capacitors (third capacitor 306 and fifth capacitor 310) enables a voltage division between the antenna resonant circuit and the input connections 311, 312, but, as a result, the passive damping through the parallel resistor is no longer effective, since this damping circuit is cut off from the antenna resonant circuit by the decoupling capacitors 306, 310. In this case, for example, an XOR modulation for modulation schemes according to ISO/IEC 14443 Type A with a high bit rate, Type B and Felica cannot typically be supported.

According to different embodiments, an active damping is used which enables the removal (or at least the reduction for the most part) of the energy contained in the antenna resonant circuit before a synchronization pause, even for a high-quality and high-inductance antenna 302.

Figure 4:
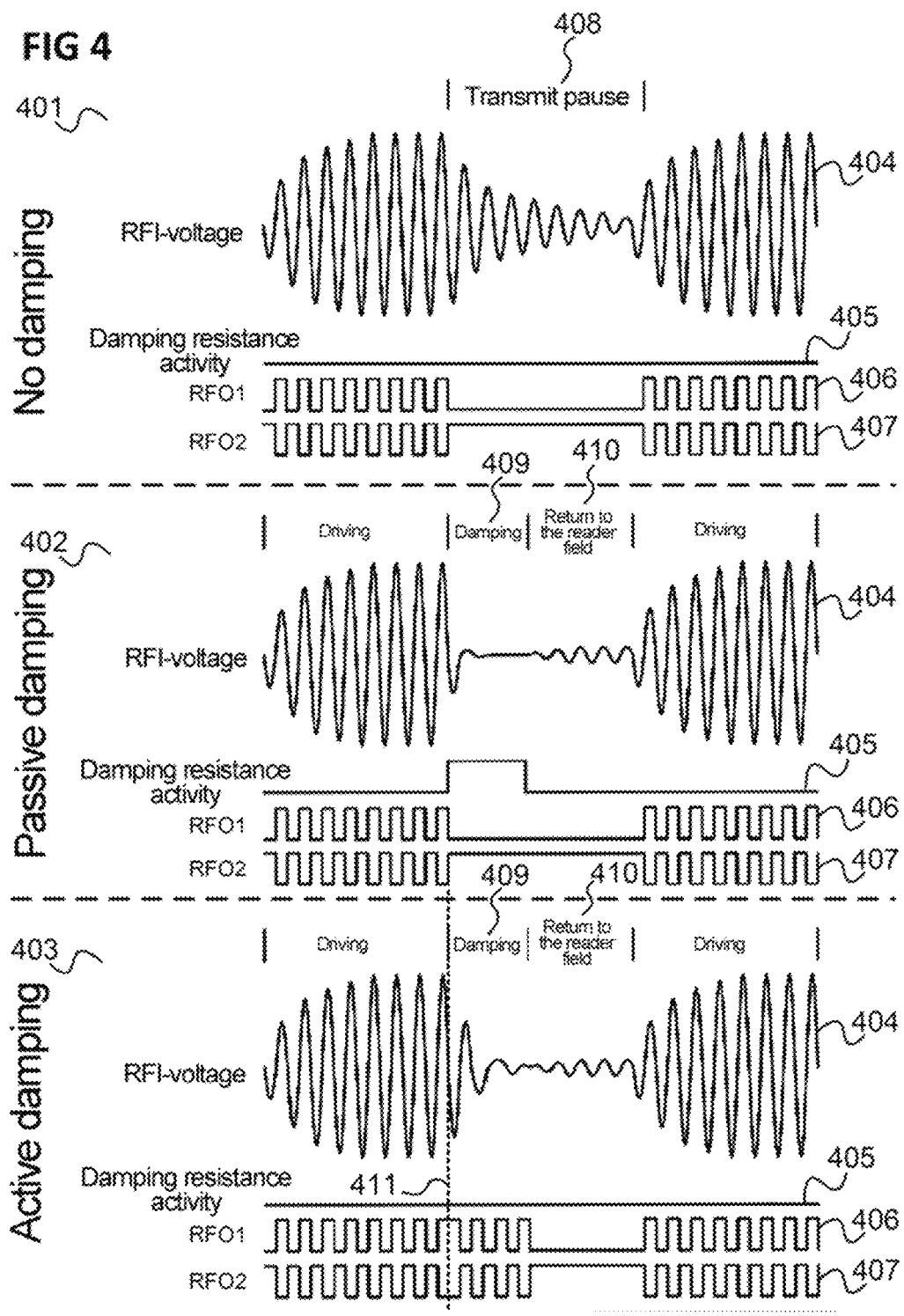
FIG. 4 shows a comparison between a case without damping, a case with passive damping and a case with active damping.

FIG. 4 shows a comparison between a case without damping (in a first diagram 401), a case with passive damping (in a second diagram 402) and a case with active damping (in a third diagram 403).

In the diagrams 401, 402, 403, time runs from left to right (i.e. in the x-direction) and the different signal levels are shown in the y-direction.

In the diagrams 401, 402, 403, a respective first curve 404 shows the characteristic of the voltage between the inputs 307 and 311, a respective second curve 405 shows a possible connection of a damping resistor between the inputs 307 and 311, a respective third curve 406 shows the potential applied to the first output 305, and a respective fourth curve 407 shows the potential applied to the second output 309.

In the case without damping (first diagram 401), no damping resistor is used and the second curve 405 is correspondingly constant at a low level. In a transmit pause 408, both outputs 305, 309 are connected to a constant potential (e.g. the same potential, e.g. ground potential) and the amplitude of the voltage which oscillates between the input nodes 307, 311 and reflects the energy contained in the antenna resonant circuit decreases relatively slowly.

In the case with passive damping (second diagram 402), a damping resistor is connected between the inputs 307, 311 in a damping period 409 at the start of the transmit pause. The two outputs 305, 309 are connected to a constant potential. The amplitude of the voltage which oscillates between the input nodes 307, 311 and reflects the energy contained in the antenna resonant circuit decreases relatively quickly in the damping period 409 and a subsequent synchronization period 410 of the transmit pause can be used for the synchronization with the reader field.

As explained above, however, the use of a damping resistor is unwanted or is not effective in some cases or requires a low-impedance coupling (internal coupling) from the antenna to the inputs.

In the case with active damping (third diagram 403), as provided according to different embodiments, no damping resistor is used and the second curve 405 is correspondingly constant at a low level.

In a damping period 409 at the start of the transmit pause, the potentials on the output connections are inverted. In other words, the potentials are phase-shifted through 180 degrees, visible for the time 411, on the output connections on which the length of the present pulse on the outputs 305, 309 is doubled due to the phase shift.

The oscillation which is fed to the antenna resonant circuit is thus in phase opposition to the oscillation present in the antenna resonant circuit.

The amplitude of the voltage which oscillates between the input nodes 307, 311 and reflects the energy contained in the antenna resonant circuit therefore decreases relatively quickly in the damping period 409 and the frontend 301 can use a subsequent synchronization period 410 of the transmit pause to synchronize the oscillator 209 with the reader field.

The active damping can be used with internal or external coupling. It enables the use of XOR modulation for all modulation schemes and bit rates for an antenna structure of the type shown in FIG. 3.

The active driving of the output connections 305, 309 in the opposite direction (i.e. with the inverted carrier wave), as provided according to different embodiments with active damping, eliminates the energy in the antenna resonant circuit and opens a window in which the reader field is present, can be picked up by the antenna resonant circuit and can be used by the NFC communication device 201 to synchronize the oscillator 209 with the reader field. The frontend 203 can set the duration and level of the inverted carrier wave according to parameters of the antenna 302 (e.g. inductance and quality factor).

Conversely, in the case of no damping, as illustrated in the first diagram 401, the energy in the antenna resonant circuit is too high (even after the carrier wave has been switched off in the transmit pause), as a result of which the synchronization period is corrupted.

The active damping according to different embodiments can be used e.g. for a three-phase XOR modulation for a high-quality and/or high-inductance antenna, for ISO/IEC 14443 Type A transmission with high bit rates, for ISO/IEC 14443 Type B transmission with a standard baud rate and higher bit rates and for Felica 212 kbit/s and 424 kbit/s. It allows the operation of the NFC communication device 201 at a greater distance from the reader device 202 and results in better interoperability and operator convenience for the user.

Figure 5:
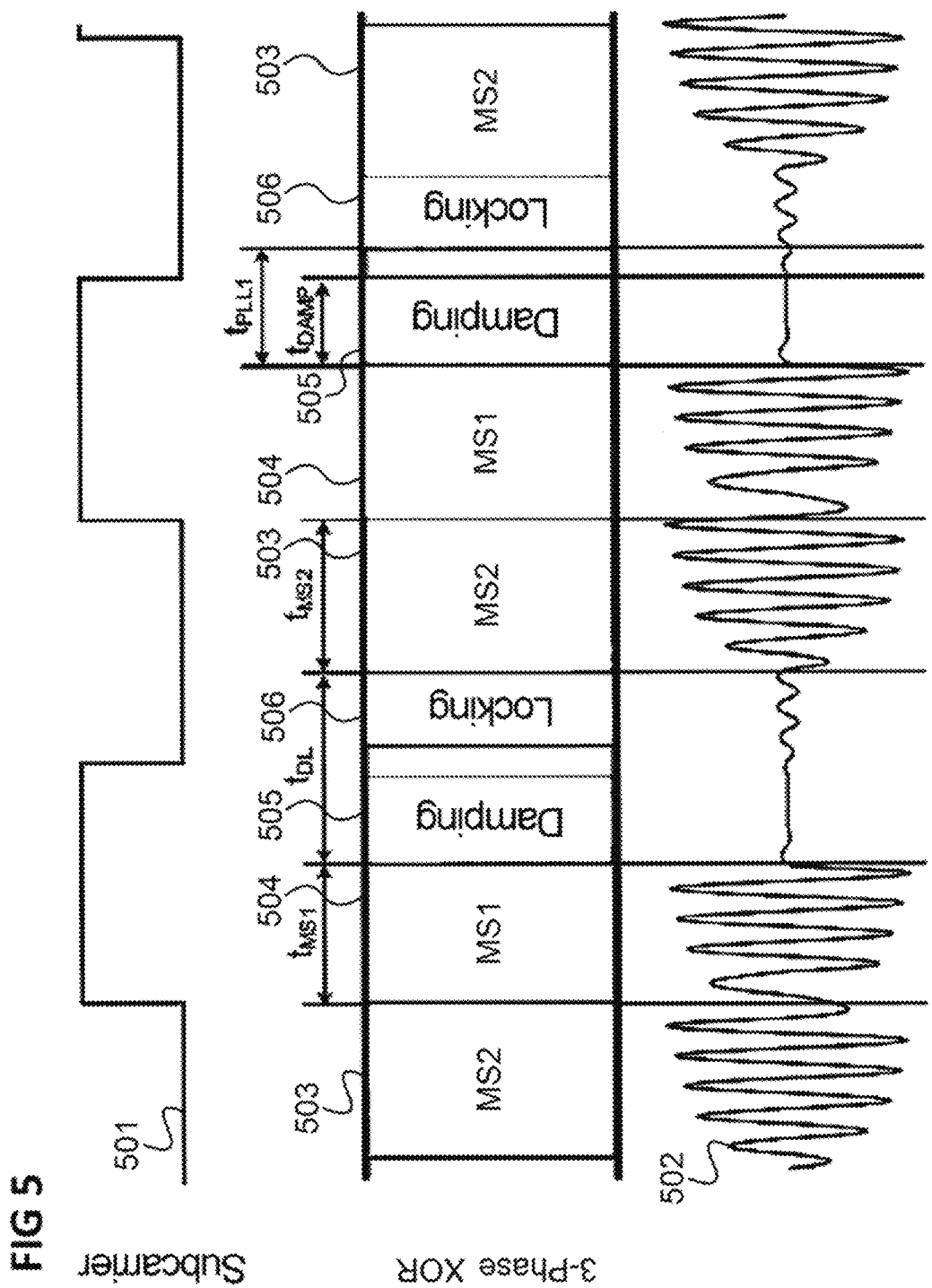
FIG. 5 illustrates an active damping with a three-phase XOR modulation.

FIG. 5 illustrates an active damping with a three-phase XOR modulation.

As in FIG. 4, time runs in FIG. 5 from left to right (i.e. in the x-direction) and the different signal levels are shown in the y-direction.

A first curve 501 illustrates the subcarrier. The signal transmission is performed according to the XOR modulation communication protocol used in this example by means of a successive connection of subcarriers. The subcarrier 501 shown serves, for example, to transmit a single bit from the NFC communication device 201 to the reader device 202. The subcarrier with the shown phase represents, for example, a binary 1 or a binary 0.

A second curve 502 shows the characteristic of the voltage between the inputs 307 and 311, i.e. the effective voltage in the antenna resonant circuit, the amplitude of which represents the energy contained in the antenna resonant circuit.

In the transmit periods 503, 504 (as provided according to the communication protocol that is used), the frontend 301 feeds the normal (i.e. non-inverted) carrier wave to the antenna 302 via the outputs 305, 309. Rising edges of the subcarrier 501 are transmitted by means of a phase shift between an MS2 transmit period 503 and an MS1 transmit period 504. The MS1 transmit period is followed by a damping period 505 in which the frontend 301 feeds the carrier wave (inverted compared with the preceding MS1 transmit period 504) to the antenna 302 (or to the antenna resonant circuit). The amplitude of the voltage between the input connections 311, 312 quickly decreases and the antenna resonant circuit is then excited by the reader field, which the frontend 301 uses in a following locking period 506 in order to set the oscillator 209 (e.g. a PLL) to the frequency and phase of the reader field, i.e. to synchronize the oscillator 209 with the reader field.

As explained, the active damping is performed through feeding of the inverted carrier wave, i.e., in other words, through transmission of the inverted carrier, by the frontend 301 on the output terminals 305, 309. The frontend can set the strength of the transmission of the inverted carrier individually and adapt it dynamically according to the present signal strength of the non-inverted carrier. According to one embodiment, the frontend 301 can define the damping period in steps of half carrier cycles.

Figure 6:
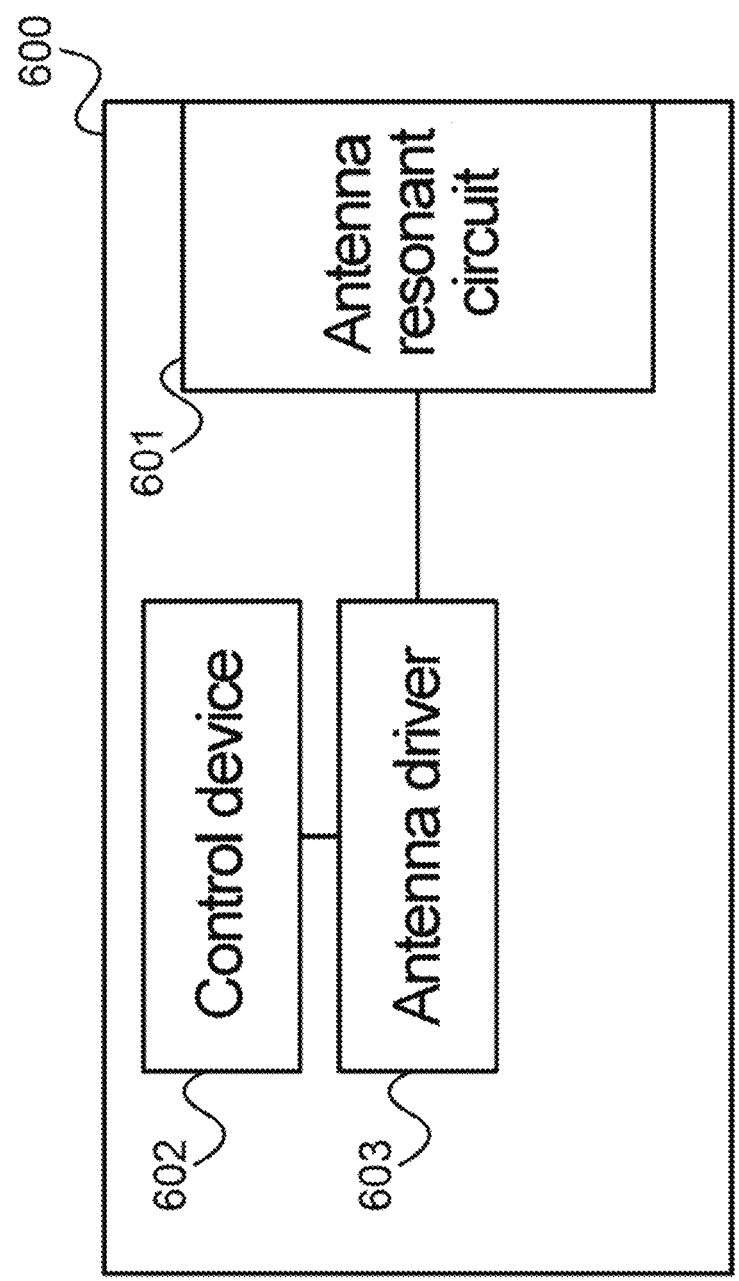
FIG. 6 shows a communication device according to one embodiment.

In summary, a communication device of the type shown in FIG. 6 is provided according to different embodiments.

FIG. 6 shows a communication device 600 according to one embodiment.

The communication device 600 has an antenna resonant circuit 601 and an antenna driver 602 which is configured to feed a carrier wave to the antenna resonant circuit 601.

The communication device 600 furthermore has a control device 603 which is configured to detect that a synchronization period is imminent and is configured to control the antenna driver 602 in such a way that it feeds the inverted carrier wave to the antenna resonant circuit 601.

In other words, the antenna driver supplies the antenna resonant circuit with a carrier wave in normal operation, e.g. in transmit mode. If a synchronization period is imminent, in other words a time interval before which energy is intended to be removed from the antenna resonant circuit, the control device controls the antenna resonant circuit in such a way that it feeds the inverted carrier to the antenna resonant circuit. The antenna driver feeds, for example, a carrier wave (with a specific frequency and phase) to the antenna resonant circuit during a certain time period and, if the control device detects that a synchronization period is imminent, it controls the antenna driver in such a way that it feeds the carrier wave with a 180-degree phase shift (and therefore the carrier wave inverted compared with the previously fed carrier wave) to the antenna resonant circuit.

According to the communication protocol that is used, e.g. according to a frame structure of the communication protocol, the control device can establish (i.e. detect) that a synchronization period is imminent, e.g. as part of a transmit pause in which the communication device does not transmit according to the communication protocol. The inverted carrier wave which the antenna driver feeds to the antenna resonant circuit is therefore not used, in particular, for data transmission, and is, for example, free from modulation (e.g. amplitude modulation or phase modulation) or at least free from modulation according to data to be transmitted.

Following sufficient damping, the antenna driver stops, for example, the feed of the inverted carrier wave to the antenna and feeds neither the carrier wave nor the inverted carrier wave to the antenna in order to enable the antenna resonant circuit to synchronize itself with a reader field, i.e. to be excited by the reader field and oscillate synchronously with the reader field.

The active damping enables a fast removal of the energy stored in the antenna resonant circuit. More time is accordingly available (compared with no damping or passive damping), so that, for example, the transmit pause can be shortened (e.g. can be started later) and more time can be used for transmission. The redundancy of the data transmission, for example, can thereby be increased (e.g. through transmission of greater parts of a subcarrier), which in turn increases the robustness of the data transmission.

The control device can be configured to control the antenna driver for so long that it feeds the inverted carrier wave to the antenna resonant circuit until the energy contained in the antenna resonant circuit lies below a predefined threshold value. The corresponding duration can be estimated in advanced or can be determined through simulation of one or more typical cases. The inverted carrier wave is fed to the antenna resonant circuit, for example, for the duration of at least a plurality of clock cycles.

Figure 7:
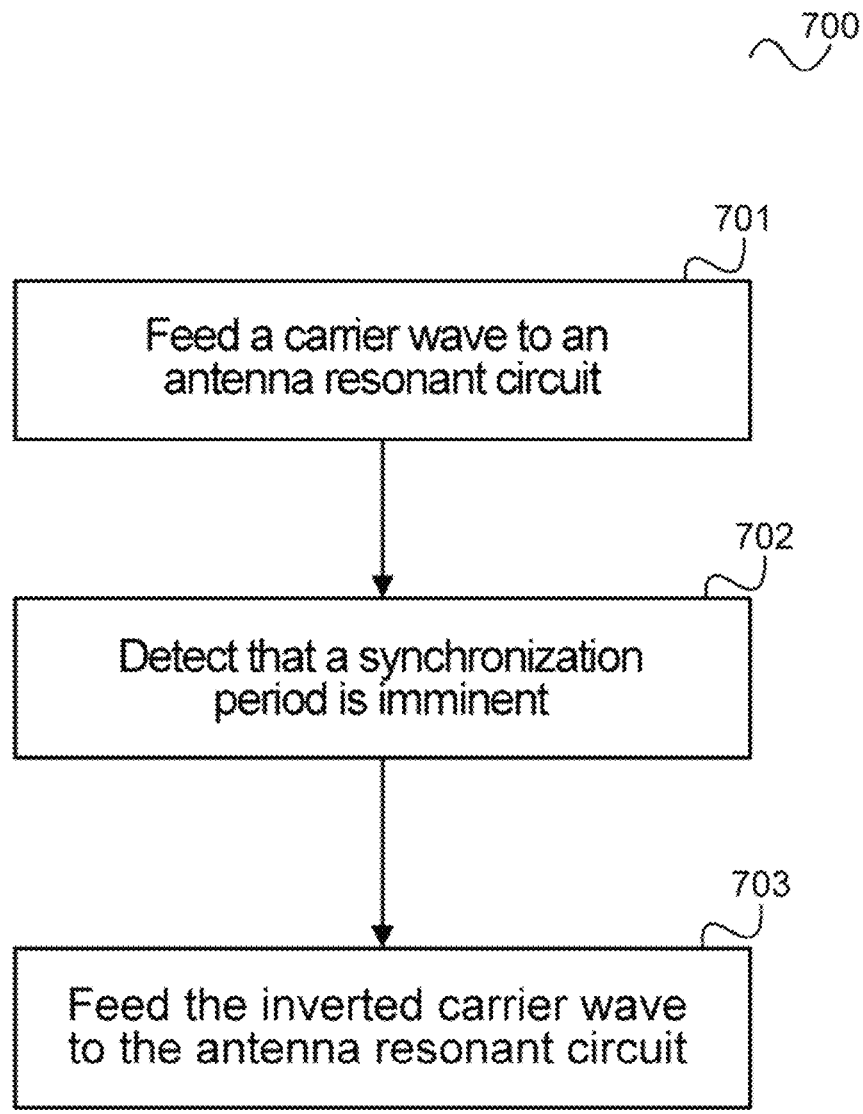
FIG. 7 shows a process diagram which illustrates a method for operating an antenna resonant circuit according to one embodiment.

FIG. 7 shows a process diagram 700 which illustrates a method for operating an antenna resonant circuit according to one embodiment.

In 701, a carrier wave is fed to an antenna resonant circuit.

In 702, it is detected that a synchronization period is imminent.

In 703, the inverted carrier wave is fed to the antenna resonant circuit.

Different example embodiments are indicated below.

Example embodiment 1 is a communication device as shown in FIG. 6.

Example embodiment 2 is a communication device according to example embodiment 1, furthermore having a transmit device which is configured to transmit data on the basis of the carrier wave.

Example embodiment 3 is a communication device according to example embodiment 2, wherein the transmit device is configured to transmit the data according to a communication protocol, wherein the synchronization period is imminent according to the communication protocol.

Example embodiment 4 is a communication device according to example embodiment 3, wherein the control device is configured to detect that a synchronization period is imminent on the basis of the communication protocol.

Example embodiment 5 is a communication device according to example embodiment 3 or 4, wherein the antenna driver is configured to feed the carrier wave to the antenna resonant circuit in order to transmit data in a transmit period according to the communication protocol, and the synchronization period is part of a transmit pause in which the transmit device transmits no data according to the communication protocol.

Example embodiment 6 is a communication device according to one of example embodiments 1 to 5, wherein the synchronization phase is a phase for synchronizing the communication device with the frequency and phase of a different communication device.

Example embodiment 7 is a communication device according to one of example embodiments 1 to 6, wherein the control device is configured to control the antenna driver for so long that it feeds the inverted carrier wave to the antenna resonant circuit until the energy contained in the antenna resonant circuit lies below a predefined threshold value.

Example embodiment 8 is a communication device according to one of example embodiments 1 to 7, wherein the control device is configured to control the antenna driver in such a way that impedance matching exists between the antenna driver and the antenna resonant circuit during the feeding of the inverted carrier wave to the antenna resonant circuit.

Example embodiment 9 is a communication device according to one of example embodiments 1 to 8, having a frequency generator which is configured to generate the carrier wave.

Example embodiment 10 is a communication device according to example embodiment 9, having a receiver which is configured to receive a reference carrier signal in the synchronization period and is configured to synchronize the frequency generator with the carrier wave.

Example embodiment 11 is a method for operating an antenna resonant circuit, as described in FIG. 7.

Example embodiment 12 is a method according to example embodiment 11, furthermore entailing transmission of data on the basis of the carrier wave.

Example embodiment 13 is a method according to example embodiment 12, entailing transmission of the data according to a communication protocol, wherein the synchronization period is imminent according to the communication protocol.

Example embodiment 14 is a method according to example embodiment 13, entailing detection that a synchronization period is imminent on the basis of the communication protocol.

Example embodiment 15 is a method according to example embodiment 13 or 14, entailing feeding of the carrier wave to the antenna resonant circuit in order to transmit data in a transmit period according to the communication protocol, wherein the synchronization period is part of a transmit pause in which the transmit device transmits no data according to the communication protocol.

Example embodiment 16 is a method according to one of example embodiments 11 to 15, wherein the synchronization phase is a phase for synchronizing one communication device with the frequency and phase of another communication device.

Example embodiment 17 is a method according to one of example embodiments 11 to 16, entailing feeding of the inverted carrier wave to the antenna resonant circuit until the energy contained in the antenna resonant circuit lies below a predefined threshold value.

Example embodiment 18 is a method according to one of example embodiments 11 to 17, entailing feeding of the inverted carrier wave to the antenna resonant circuit by means of an antenna driver in such a way that impedance matching exists between the antenna driver and the antenna resonant circuit during the feeding of the inverted carrier wave to the antenna resonant circuit.

Example embodiment 19 is a method according to one of example embodiments 11 to 18, entailing generation of the carrier wave by means of a frequency generator.

Example embodiment 20 is a method according to example embodiment 19, entailing reception of a reference carrier signal in the synchronization period and synchronization of the frequency generator with the carrier wave.

According to a further example embodiment, a transmit device is provided which has a clock generator for providing a carrier frequency, a driver device which is configured to feed an antenna in a transmit period on the basis of the carrier frequency and is configured to feed the antenna following a transmit period on the basis of the inverted carrier frequency.

Although the invention has been shown and described above all with reference to specific embodiments, it should be understood by persons skilled in the art that numerous modifications in terms of design and details can be made thereto without departing the essence and scope of the invention as defined by the following claims. The scope of the invention is therefore defined by the attached claims, and it is intended that all modifications which fall within the literal meaning and equivalence range of the claims are encompassed.

REFERENCE NUMBER LIST

100 Communication arrangement
101 NFC communication device
102 NFC reader device
103 Reader antenna 104 Frontend
105 NFC antenna
106 Integrated circuit
200 Communication arrangement
201 NFC communication device
202 NFC reader device
203 Booster frontend
204 Integrated circuit
205 Frontend
206 Interface
207 NFC antenna
208 Reader antenna
209 Frequency generator
301 Frontend
302 Antenna
303 Capacitor
304 Capacitor
305 Output connection
306 Capacitor
307 Input connection
308 Capacitor
309 Output connection
310 Capacitor
311 Input connection
312 Ground connection
313 Antenna connection
314 Antenna connection
401 Diagram (no damping)
402 Diagram (passive damping)
403 diagram (active damping)
404 Voltage characteristic
405 Damping resistance activity
406 Fed potential
407 Fed potential
408 Transmit pause
409 Damping period
410 Synchronization period
411 Time
501 Subcarrier
502 Voltage characteristic
503 MS2 transmit period
504 MS1 transmit period
505 Damping period
506 Locking period
600 Communication device
601 Antenna resonant circuit
602 Antenna driver
603 Control device
700 Process diagram
701 Process step
702 Process step
703 Process step

The invention claimed is:

1. A communication device, comprising:
an antenna resonant circuit;
an antenna driver which is configured to feed a carrier wave to the antenna resonant circuit in order to transmit data in a transmit period according to a communication protocol;
a controller which is configured to detect that a synchronization period is imminent on the basis of the communication protocol and is configured to control the antenna driver in such a way that the antenna driver feeds the inverted carrier wave to the antenna resonant circuit, wherein the synchronization period is part of a transmit pause in which the transmitter transmits no data according to the communication protocol; and
a transmitter which is configured to transmit the data on the basis of the carrier wave according to the communication protocol.

2. The communication device as claimed in claim 1, wherein the synchronization period is a phase for synchronizing the communication device with the frequency and phase of another communication device.

3. The communication device as claimed in claim 1, wherein the controller is configured to control the antenna driver to feed the inverted carrier wave to the antenna resonant circuit until the energy in the antenna resonant circuit lies below a predefined threshold value.

4. The communication device as claimed in claim 1, wherein the controller is configured to control the antenna driver in such a way that impedance matching exists between the antenna driver and the antenna resonant circuit during the feeding of the inverted carrier wave to the antenna resonant circuit.

5. The communication device as claimed in claim 1, further comprising:
a frequency generator which is configured to generate the carrier wave.

6. The communication device as claimed in claim 5, further comprising:
a receiver which is configured to receive a reference carrier signal in the synchronization period and is configured to synchronize the frequency generator with the carrier wave.

7. A method for operating an antenna resonant circuit, comprising:
an antenna driver feeding a carrier wave to an antenna resonant circuit in order to transmit data in a transmit period according to a communication protocol;
a controller detecting that a synchronization period is imminent according to the communication protocol;
the antenna driver, based on control from the controller, feeding the inverted carrier wave to the antenna resonant circuit; and
a transmitter transmitting the data on the basis of the carrier wave according to the communication protocol, wherein the synchronization period is part of a transmit pause in which the transmitter transmits no data according to the communication protocol.

8. The method as claimed in claim 7, wherein the synchronization period is a phase for synchronizing the communication device with the frequency and phase of another communication device.

9. The method as claimed in claim 8, further comprising:
the controller controlling the antenna driver to feed the inverted carrier wave to the antenna resonant circuit until the energy in the antenna resonant circuit lies below a predefined threshold value.

10. The method as claimed in claim 7, further comprising:
the controller controlling the antenna driver in such a way that impedance matching exists between the antenna driver and the antenna resonant circuit during the feeding of the inverted carrier wave to the antenna resonant circuit.

11. The method as claimed in claim 7, further comprising:
a frequency generator generating the carrier wave.

12. The method as claimed in claim 11, further comprising:
a receiver receiving a reference carrier signal in the synchronization period and synchronizing the frequency generator with the carrier wave.

* * * * *